US011538103B1

(12) United States Patent
Low et al.

(10) Patent No.: US 11,538,103 B1
(45) Date of Patent: Dec. 27, 2022

(54) FINANCIAL EDUCATION TOOL

(71) Applicant: United Services Automobile Association (USAA), San Antonio, TX (US)

(72) Inventors: Shawn D. Low, San Antonio, TX (US); Thirumurugan Thyagarajan, San Antonio, TX (US); Samuel Steven Wolf, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/161,926

(22) Filed: Jan. 29, 2021

Related U.S. Application Data (60) Provisional application No. 62/968,390, filed on Jan. 31, 2020.

(51) Int. Cl.
*G06Q 40/02* (2012.01)
*G06T 19/00* (2011.01)

(52) U.S. Cl.
CPC ........... *G06Q 40/02* (2013.01); *G06T 19/006* (2013.01)

(58) Field of Classification Search
CPC .............................. G06Q 40/02; G06T 19/006
See application file for complete search history.

(56) References Cited

U.S. PATENT DOCUMENTS

| | | | | |
|---|---|---|---|---|
| 9,177,451 | B2 * | 11/2015 | Calman | G06Q 20/127 |
| 10,846,534 | B1 * | 11/2020 | Furlan | G06Q 10/087 |
| 2012/0232968 | A1 * | 9/2012 | Calman | G06Q 20/322 |
| | | | | 705/14.4 |
| 2012/0233015 | A1 * | 9/2012 | Calman | G06K 9/00744 |
| | | | | 705/26.8 |
| 2014/0093187 | A1 * | 4/2014 | Yehezkel | G06F 3/013 |
| | | | | 382/305 |
| 2016/0070439 | A1 * | 3/2016 | Bostick | G06F 3/0304 |
| | | | | 715/728 |
| 2016/0086221 | A1 * | 3/2016 | Weinblatt | G06F 1/1686 |
| | | | | 705/14.53 |
| 2018/0165984 | A1 * | 6/2018 | Waldron | G09B 5/02 |
| 2022/0027835 | A1 * | 1/2022 | Rocco | G06Q 10/0639 |

OTHER PUBLICATIONS

Kenton, Will. "Augmented Reality," Investopedia. Jun. 19, 2018. (Year: 2018).*

(Continued)

*Primary Examiner* — Elda G Milef
(74) *Attorney, Agent, or Firm* — Fletcher Yoder P.C.

(57) ABSTRACT

A system includes one or more processors configured to receive income-related data, receive an input comprising an image that corresponds to a desired acquisition, access at least one database to identify a cost of the desired acquisition, generate a first purchase plan for the desired acquisition based on the income-related data and the cost, graphically augment the image to generate a graphically-augmented version of the image comprising at least a portion of the image and the purchase plan, and display the graphically-augmented version of the image on a device.

18 Claims, 2 Drawing Sheets

(56) References Cited

OTHER PUBLICATIONS

Agarwal, Pranav. "Augmented Reality: Explored." <https://medium.com/acmvit/augmented-reality-explored-fc811b5eb770>. Jan. 5, 2019. (Year: 2019).*

Jain et al. "Overlay: Practical Mobile Augmented Reality" 2015 (Year: 2015).*

"Augmented Reality for E-Commerce,"ARStudio Pro. Dec. 2019 (Year: 2019).*

"How AR/VR Will Transform eCommerce Industry in 2019?" CDN Solutions Group. Aug. 2, 2019. (Year: 2019).*

"The Second Coming of Consumer Smartglasses." Lenses & Technology. Aug. 2019 (Year: 2019).*

* cited by examiner

FINANCIAL EDUCATION TOOL

CROSS-REFERENCE TO RELATED APPLICATION

The present disclosure is related to, and claims priority to, U.S. Provisional Application No. 62/968,390, entitled "FINANCIAL EDUCATION TOOL," which was filed on Jan. 31, 2020, and which is herein incorporated by reference in its entirety for all purposes.

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Children may grow up with little financial awareness of the costs of purchasing items, such as toys, electronics, etc. To assist children in effectively understanding the costs of purchasing the items, adults may provide verbal explanations of what the items cost or whether the items fit into a family's budget. To better educate the children on the value of money, it may be desirable to provide a financial education tool to teach children about finances.

SUMMARY

Certain embodiments commensurate in scope with the present disclosure are summarized below. These embodiments are not intended to limit the scope of the disclosure, but rather these embodiments are intended only to provide a brief summary of possible forms of present embodiments. Indeed, present embodiments may encompass a variety of forms that may be similar to or different from the embodiments set forth below.

In one embodiment, a system includes one or more processors configured to receive income-related data, receive an input comprising an image that corresponds to a desired acquisition, access at least one database to identify a cost of the desired acquisition, generate a first purchase plan for the desired acquisition based on the income-related data and the cost, graphically augment the image to generate a graphically-augmented version of the image comprising at least a portion of the image and the purchase plan, and display the graphically-augmented version of the image on a device.

In one embodiment, a system includes one or more processors configured to receive income-related data, where the income-related data comprises a task-based format, a time-based format, or an incentive-based format, or any combination thereof. The one or more processors are configured to receive an input that corresponds to a desired acquisition, search a database to identify a cost of the desired acquisition, and generate a first purchase plan for the desired acquisition based on the income-related data and the cost, where the first purchase plan includes an expected time at which a user will accumulate a desired amount of income to purchase the desired acquisition. The one or more processors monitor whether the user follows the first purchase plan to accumulate the desired amount of income by the expected time, and generate a second purchase plan for the desired acquisition based on the income-related data and the cost in response to determining that the user is not projected to accumulate the desired amount of income to purchase the desired acquisition by the expected time via the first purchase plan.

In one embodiment, a system includes one or more processors configured to receive income-related data, where the income-related data comprises a task-based format, a time-based format, or an incentive-based format, or any combination thereof. The one or more processors are configured to receive an input that corresponds to a desired item. The one or more processors are configured to determine a cost of the desired item based on the input, generate a purchase plan for the desired item based on the income-related data and the cost, where the purchase plan includes an expected time at which a user will accumulate a desired amount of income to purchase the desired item. The one or more processors are configured to monitor whether the user follows the purchase plan to accumulate the desired amount of income by the expected time and identify a different item for the user to purchase in place of the desired item in response to determining that the user is not projected to accumulate the desired amount of income to purchase the desired item by the expected time via the purchase plan.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure are described above. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to using augmented reality or electronic devices to assist in various cost analyses and assessments. More specifically, the present disclosure relates to adjusting visualizations depicted via an electronic display to assist in various cost analyses and assessments of particular items. These techniques may be used to improve a person's financial education. Specifically, these techniques may be used to improve a person's understanding of how to save money for an item the person would like to purchase.

The present disclosure describes a financial education system that enables a person to plan for a purchase by implementing a savings plan to meet a financial goal. The financial education system described herein may receive income-related data in a task-based format, a time-based format, an incentive-based format, and/or any other suitable format and may receive an input representative of a particular item the person would like to purchase. The input may be in the form of a photograph of the desired item (e.g., a scanned bar code, a stock keeping unit (SKU), a universal product code (UPC), an Amazon® standard identification number (ASIN), other alphanumeric identifier, a web link to the product, and so forth. The financial education system may access or determine a cost of the particular item based on the input.

The financial education system may then calculate an amount of time that would need to pass and/or a number of tasks (e.g., chores) that the person would need to complete in order to accumulate enough income to buy the particular item (e.g., an acquisition of a particular item). In some embodiments, the financial education system may take into account the person's preferences for tasks. For example, the financial education system could reduce the number of times a particular task is suggested (e.g., included in one or more purchase plans) if the person indicates a dislike of that particular task. Various combinations of tasks and/or expected income can be used by the financial education system to create one or more purchase plans. For example, the tasks could include chores that would result in a certain amount of income being paid to the person. Expected income could include an allowance, a gift (e.g., a birthday gift), an inheritance, and so forth. The one or more purchase plans can be output to the person, such as by being overlaid onto the input (e.g., photograph) to create an augmented version of the input (e.g., graphically-augmented version of the input; an image having the photograph or a portion of the photograph, such as the particular item in the photograph, and also having the one or more purchase plans, which may be presented as a graph or table), which is then displayed onto the person's device to promote a better financial awareness. The increased financial awareness may help the person better understand the value of the particular item. The disclosed embodiments may be particularly helpful for children. Thus, to facilitate discussion, the disclosed embodiments are described with reference to children. However, it should be appreciated that the disclosed embodiments may be used for an adult or a person of any age, as explained in further detail below. Additionally, to facilitate discussion, the terms "user" and "child user" are utilized in certain examples. However, it should be appreciated that these terms may be interchangeable (e.g., inputs described as being provided by the user may be completed by the child user, and inputs described as being provided by the child user may be completed by any user).

Figure 1:
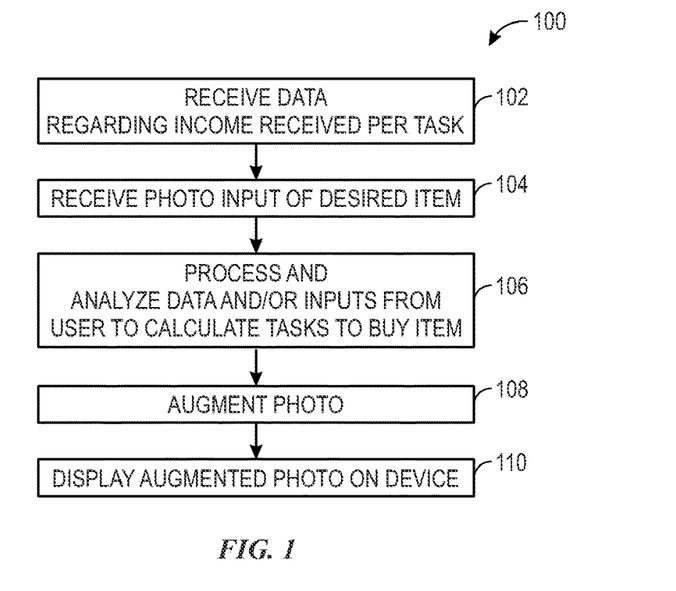
FIG. 1 depicts a flow diagram of an example process for implementing a financial education system, according to implementations of the present disclosure.

FIG. 1 depicts a flow diagram of an example process 100 for educating children on purchasing items, according to implementations of the present disclosure. The process 100 includes various steps represented by blocks. Certain steps of the method 110 may be performed as an automated procedure by a system, such as the financial education system. Although the flow diagram illustrates the steps in a certain sequence, it should be understood that the steps may be performed in any suitable order, certain steps may be carried out simultaneously, and/or certain steps may be omitted, and other steps may be added, where appropriate. Further, certain steps or portions of the process 100 may be performed by separate devices.

At block 102, a computing system (e.g., a financial education computing system) may receive income-related data. The income-related data received may be input by a user of a financial education application. The user 300 may be an adult (e.g., parent of the child) or a child. It may be appreciated that the income-related data received can be input in a task-based format, a time-based format, an incentive based-format, and/or any other suitable format. The income-related data may be stored (e.g., in a storage device; in a database) and may be accessed and/or processed (e.g., by a processor) to carry out the other steps in the process 100.

When the income-related data is input in a task-based format, the user of the financial education application may determine that a child's tasks are worth a certain amount of income. The user may input into the financial education application various tasks and corresponding amounts of income. The user may also categorize the tasks as high value tasks (as compared to nominal value tasks), seasonal tasks, preferred tasks, or other ways of categorizing the tasks so that the computing system can determine, and/or the child can appreciate, the availability of task options to increase the child's earning potential.

Indeed, the user may classify certain tasks as high value tasks. Examples of high value tasks could include cleaning the pool or mowing the lawn, while nominal value tasks could include unloading the dishwasher, sweeping the floors, or taking out the trash. The high value tasks may earn the child more income (e.g., $10 to clean the pool or $8 to mow the lawn) compared to nominal value tasks, such as unloading the dishwasher or sweeping the floors (e.g., $3 to unload the dishwasher or $1 to sweep the floors).

The user could also input tasks that are seasonal, such as raking the leaves in the fall, shoveling snow in the winter, or cleaning the grill in the summer. Accordingly, when the computing system and/or the child attempts to determine which tasks the child may be able to do to increase the child's earning potential, seasonal chores can be added during the appropriate season. Although the embodiments described herein thus far have focused on earning potential tied to tasks, it may be appreciated that the computing system receive the income-related data in a time-based format. When the income-related data is input in a time-based format, the user may indicate the expected amount of income the child receives per time period (e.g., per week; for completing the child's tasks). For example, the user may indicate that a child is expected to earn $10 per week for completing all of the child's tasks.

The user can also input incentives that the child can attempt to achieve in order to increase the child's earning potential. Examples of such incentives could include behaving well at a visit to the child's grandmother's home or excelling in sports or academics (e.g., improving in a particular subject at school or exhibiting good sportsmanship at a soccer game). The computing system may use these incentive-based tasks and/or these incentive-based tasks can be viewed on the financial education application, so that the child may gain an understanding of how the child can increase the child's earning potential in order to buy a particular item. Further understanding of how the particular item is queried in the financial education application may be understood by the discussion below.

At block 104, the computing system may receive an input indicative of the particular item (e.g., desired item) that the child would like to buy. The input may be in the form of a photograph of the desired item, a scan of a bar code, a stock keeping unit (SKU), a universal product code (UPC), an Amazon® standard identification number (ASIN), other alphanumeric identifier, a web link to the product, or any other suitable identification means. The child user may also search for the desired item in the financial education application. For example, the child user could search for the term "army truck." The application may then query a number of possible army truck toys from a database that includes various retailers such as Amazon, Walmart, Target, Overstock, Facebook marketplace, Craig's list, or thrift stores, among others. The child user may then select any number of the possible army truck toys that the application queries. In one embodiment, the child user could select multiple listings to compare to one another, as explained in further detail below. Based on the input, the computing system may identify the desired item and determine a cost of the desired item (e.g., using image recognition techniques to obtain the cost from an image that includes the cost, accessing a database that includes the cost of the desired item).

At block 106, the computing system may process and analyze the income-related data and the input to determine one or more purchase plans. For example, the computing system may calculate an earnings unit (e.g., a number of tasks; an amount of time; a combination of tasks) that, upon completion, will enable the child to buy the particular item. In some embodiments, the earnings unit may be calculated in a number of tasks it would take to buy the particular item based on corresponding income associated with the task. It may be appreciated that in some embodiments, the earnings unit may be calculated in an amount of time (e.g., a number of days, weeks, months) that it would take to buy the particular item based on the expected amount of income accumulated by the child over time (e.g., expected income earned per day, per week, per month). The earnings unit may be utilized to generate the one or more purchase plans, which may include suggested tasks and/or the amount of time, for the child user.

The computing system may also take into account the child user's preferences when determining the one or more purchase plans to buy the particular item. For example, the child user's preferences may include a dislike of doing certain tasks (e.g., taking out the trash). In this example, the computing system would reduce or eliminate the number of times the child has the task of taking out the trash listed in the child's one or more purchase plans. Furthermore, if the child user has a preference to accumulate as much income as quickly as possible to be able to buy the particular item more quickly, the computing system could factor this preference into the one or more purchase plans. For example, the computing system could suggest additional tasks (e.g., incentive-based tasks; a greater number of tasks than the child's has historically completed in a time period, such as in a day) that the child user can do to accumulate earnings more quickly. It may be appreciated that the child user may mark the tasks complete, rank the tasks in order of desirability, or input other information via a display associated with the device (e.g., augmented reality device, smart phone).

The computing system may generate one or more purchase plans in terms of a number of chores, historical and/or expected earnings over time, current savings, by taking into account certain chore preferences, and/or receiving other types of income and/or incentives (e.g., rewards, birthday cash received). The one or more purchase plans may be different from one another. For example, the computer system may determine and output a first purchase plan that includes a first number and/or type of tasks and a second purchase plan that includes a second number and/or type of tasks, and both the first purchase plan and the second purchase plan would enable the child user to buy the desired item. Furthermore, the first purchase plan may include other types of income (e.g., income earned at certain times; income earned other than by the completion of tasks, such as chores), while the second purchase plan may exclude such other types of income.

At block 108, the computing system may generate an output, such as an augmented version of the input of the particular item that the child would like to buy. As discussed above, the input may be in the form of a photograph, a scan of a bar code, a SKU, a UPC, an ASIN, other alphanumeric identifier, a web link to the product to go to a certain web page, or any other suitable identification means. After the computing system calculates the one or more purchase plans, as described above in the discussion pertaining to block 106, the computing system may augment the input such that the one or more purchase plans is overlaid on the input to create the augmented version of the input. For example, the one or more purchase plans may be overlaid onto the photograph of the particular item. Where the input is not the photograph (e.g., a scan of a bar code), the computing system may access an image of the particular item (e.g., from a database). Then, the one or more purchase plans may be overlaid onto the image of the particular item to provide a similar visual representation or effect, and this may also be considered the augmented version of the input.

At block 110, the computing system can then provide the output, such as by displaying the augmented version of the input via the financial education application onto a particular device, such as a cell phone, augmented reality and/or virtual reality eyewear, or other suitable device. It may be appreciated that the augmented version of the input can be accessed repeatedly (e.g., on demand) in order for the user to appreciate the number of tasks and/or the amount of time to purchase the particular item. It may be appreciated that the augmented version of the input may be displayed alongside another augmented input (e.g., having other purchase plans) or moved on the display as the user of the device sees fit.

At block 112, the computing system may store the augmented version of the input via the financial education application (e.g., onto the particular device) so that the user may save the augmented version of the input for future reference. The input (e.g., the photograph), information that indicates the desired item (e.g., a name; a link to buy the desired item), and/or the augmented version of the input may also be saved into a wish list, which can be shared with family members, friends, and so forth. The wish list may be accessed by others that may be motivated to buy items from the child's wish list that will take a longer amount of time for the child to purchase, due to the number of chores or amount of income that will be needed to buy the particular item.

Figure 2:
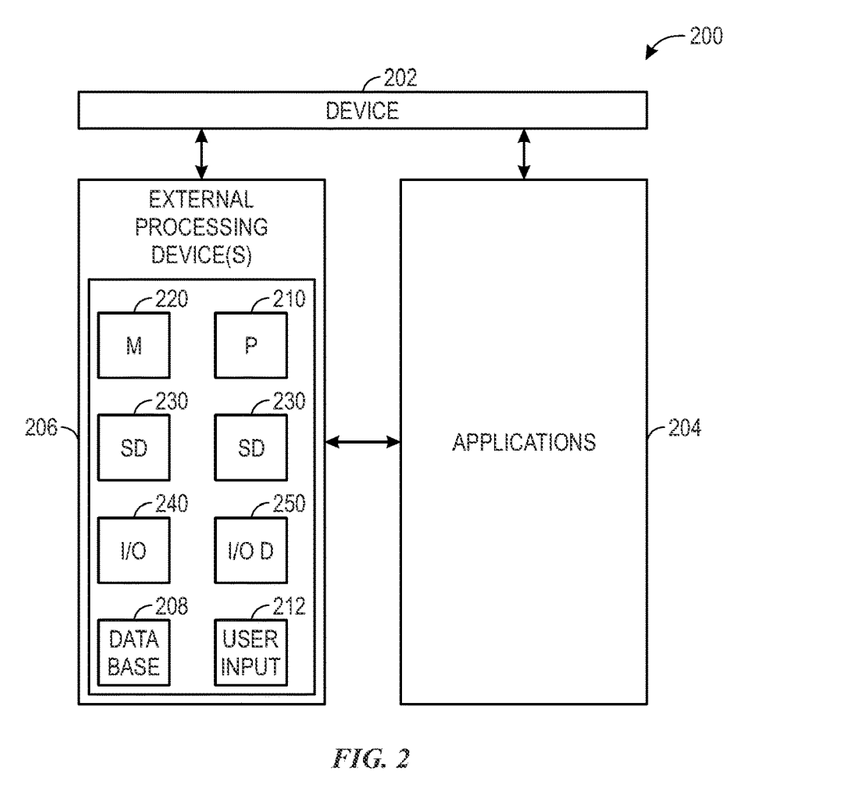
FIG. 2 depicts a block diagram of a computing system of the financial education system of FIG. 1, according to implementations of the present disclosure.

FIG. 2 depicts a block diagram of a computing system 200 (e.g., a financial education computing system), according to implementations of the present disclosure. The computing system 200 may be used for any of the operations described with respect to the various implementations discussed herein. For example, the computing system 200 may be included, at least in part, in one or more of the user devices 202 (e.g., phone, eyewear), applications 204 (e.g., financial education applications), one or more external processing devices 206, a database 208, a user input 212, and/or other device(s) described herein. The computing system 200 may include one or more processors 210, a memory 220, one or more storage devices 230, and one or more input/output (I/O) devices 250 controllable through one or more I/O interfaces 240. The various components 210, 220, 230, 240, or 250 may be interconnected through at least one system bus, which may enable the transfer of data between the various modules and components of the computing system 200.

The processor(s) 210 may be configured to process instructions for execution within the computing system 200. The processor(s) 210 may include single-threaded processor(s), multi-threaded processor(s), or both. The processor(s) 210 may be configured to process instructions stored in the memory 220 or on the storage device(s) 230. The processor(s) 210 may include hardware-based processor(s) each including one or more cores. The processor(s) 210 may include general purpose processor(s), special purpose processor(s), or both.

The memory 220 may store information within the computing system 200. In some implementations, the memory 220 includes one or more computer-readable media. The memory 220 may include any number of volatile memory units, any number of non-volatile memory units, or both volatile and non-volatile memory units. The memory 220 may include read-only memory, random access memory, or both. In some examples, the memory 220 may be employed as active or physical memory by one or more executing software modules.

The storage device(s) 230 may be configured to provide (e.g., persistent) mass storage for the computing system 200. In some implementations, the storage device(s) 230 may include one or more computer-readable media. For example, the storage device(s) 230 may include a floppy disk device, a hard disk device, an optical disk device, or a tape device. The storage device(s) 230 may include read-only memory, random access memory, or both. The storage device(s) 230 may include one or more of an internal hard drive, an external hard drive, or a removable drive.

One or both of the memory 220 or the storage device(s) 230 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the computing system 200. In some implementations, the CRSM may include a data store that provides storage of computer-readable instructions or other information in a non-transitory format. The CRSM may be incorporated into the computing system 200 or may be external with respect to the computing system 200. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 210 and the memory 220 may be supplemented by, or incorporated into, one or more application-specific integrated circuits (ASICs).

The computing system 200 may include one or more I/O devices 250 to input the user input 212 and/or access the augmented photo output by the computing system 200. The I/O device(s) 250 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 250 may also include one or more output devices such as a display, LED(s), an audio output device (e.g., a speaker), a printer, a haptic output device, and so forth. The I/O device(s) 250 may be physically incorporated in one or more computing devices of the computing system 200, or may be external with respect to one or more computing devices of the computing system 200.

The computing system 200 may include one or more I/O interfaces 240 to enable components or modules of the computing system 200 to control, interface with, or otherwise communicate with the I/O device(s) 250. The I/O interface(s) 240 may enable information to be transferred in or out of the computing system 200, or between components of the computing system 200, through serial communication, parallel communication, or other types of communication. For example, the I/O interface(s) 240 may comply with a version of the RS-232 standard for serial ports, or with a version of the IEEE 1284 standard for parallel ports. As another example, the I/O interface(s) 240 may be configured to provide a connection over Universal Serial Bus (USB) or Ethernet. In some examples, the I/O interface(s) 240 may be configured to provide a serial connection that is compliant with a version of the IEEE 1394 standard.

The I/O interface(s) 240 may also include one or more network interfaces that enable communications between computing devices in the computing system 200, or between the computing system 200 and other network-connected computing systems. The network interface(s) may include one or more network interface controllers (NICs) or other types of transceiver devices configured to send and receive communications over one or more networks using any network protocol.

Computing devices of the computing system 200 may communicate with one another, or with other computing devices, using one or more networks. Such networks may include public networks such as the internet, private networks such as an institutional or personal intranet, or any combination of private and public networks. The networks may include any type of wired or wireless network, including, but not limited to, local area networks (LANs), wide area networks (WANs), wireless WANs (WWANs), wireless LANs (WLANs), mobile communications networks (e.g., 3G, 4G, Edge), and so forth. In some implementations, the communications between computing devices may be encrypted or otherwise secured.

The computing system 200 may include any number of computing devices of any type. The computing device(s) may include, but are not limited to: augmented reality and/or virtual reality devices (e.g., eyewear, headwear), a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (e.g., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or a combination of one or more of them).

To provide for interaction with a user, implementations may be realized on a computer having a display device (e.g., a CRT [cathode ray tube] or LCD [liquid crystal display] monitor) for displaying information to the user and a keyboard and a pointing device (e.g., a mouse or a trackball) by which the user may provide input to the computer. Other kinds of devices may be used to provide for interaction with the user as well. For example, feedback provided to the user may be any appropriate form of sensory feedback (e.g., visual feedback, auditory feedback, or tactile feedback) and input from the user may be received in any appropriate form (e.g., acoustic, speech, or tactile input).

The computing system 200 may include clients and servers. A client and server are generally remote from each other and typically interact through a communication network. The relationship of client and server arises by virtue of computer programs running on the respective computers and having a client-server relationship to each other.

Figure 3:
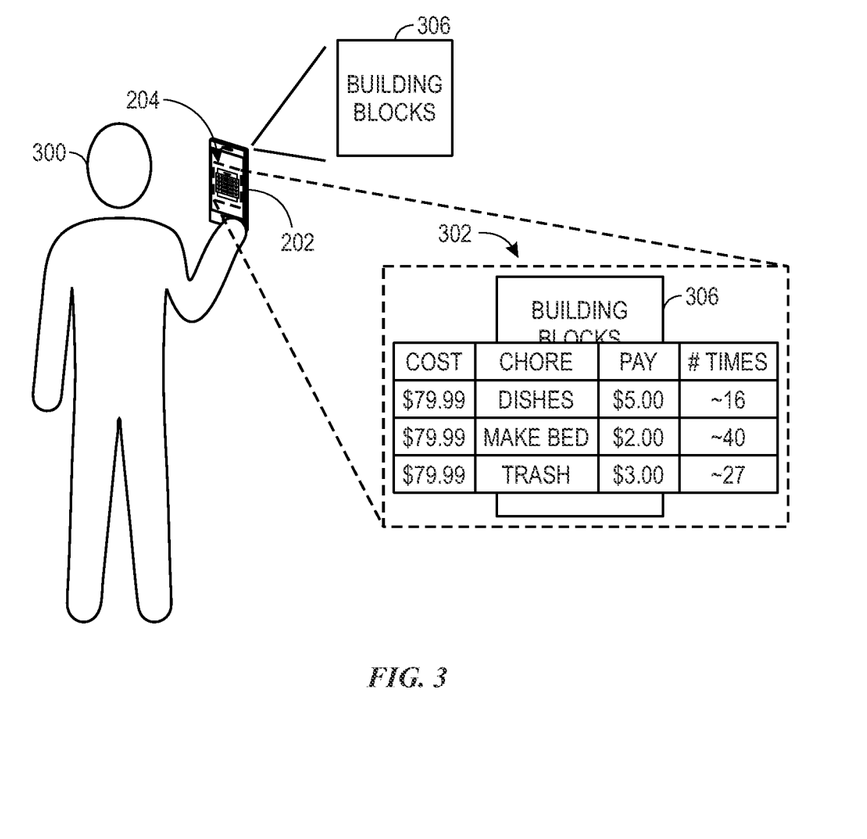
FIG. 3 depicts a schematic view of a user interacting with an application of the financial education system of FIG. 1, according to implementations of the present disclosure.

FIG. 3 depicts a schematic view of a child user 300 interacting with the application 204 of the computing system 200, according to implementations of the present disclosure. As discussed above, the computing system 200 may receive income-related data pertaining to the amount of income the child user 300 receives per task, per time period (e.g., weekly allowance), and/or in other ways, such as via one or more incentives. The computing system 200 analyzes the income-related data and the input related to the desired item 306 (e.g., photo input, bar code, web link) to create one or more purchase plans, which may be provided as an output to the child user 300. For example, the one or more purchase plans may be overlaid onto the desired item 306 to create an augmented version of the input, such as an augmented photo 302. The one or more purchase plans may also be linked to the desired item 306 and the child user 300 for future reference (e.g., associated and stored together in a database).

The discussion above may be further understood with reference to the following example. In the illustrated example, the child user 300 uses the child's device (e.g., cell phone, augmented reality and/or virtual reality device) to obtain the input indicative of the desired item 306. In this example, the child user 300 is interested in purchasing a 1000 piece set of building blocks (e.g., Legos®). As discussed above, the child user 300 can input (e.g., using a camera of the child's device) a photograph, a scan of a bar code, a SKU, a UPC, an ASIN, other alphanumeric identifier, a web link to the product, or any other suitable identification means to provide the input and to enable the computing system 200 to identify the desired item 306.

Where the child user 300 uses a smartphone, a virtual reality device (e.g., that is worn by the child user 300 and that is configured to display a virtual environment to the child user 300), or other similar user device 202, the one or more purchase plans may be presented with the desired item 306 (e.g., overlaid; by positioning the one or more purchases plans adjacent to the input and/or adjacent to the image of the desired item 306 obtained via the input). Thus, the desired item 306 and the one or more purchase plans may be viewed simultaneously on the display of the user device 202. In some cases, the virtual reality device may present a virtual shopping environment to the child user 300 to thereby enable the child user 300 to virtually experience a shopping trip (e.g., via presentation of store shelves and/or items via a display of the virtual reality device) to select the desired item 306 (e.g., via inputs at the virtual reality device). Where the child user 300 uses an augmented reality device (e.g., that is worn by the child user 300 and that is configured to augment a physical environment surrounding the child user 300), the one or more purchase plans may be displayed on a display of the augmented reality device for visualization by the child user 300 and the child user 300 may be able to simultaneously view the desired item 306 through the display of the augmented reality device. In this way, the one or more purchase plans may be presented with the desired item 306. In such cases, the one or more purchase plans may be updated and/or displayed in response to the child user 300 viewing a new item (or a barcode or other indicator associated with the new item) through the display of the augmented reality device (e.g., for a threshold period of time, which may indicate focusing on the new item and which may act as a new input of a desired item). In such cases, the augmented reality device may include a camera to capture images of at least a portion of a field of view of the child user 300 (e.g., through the display) and/or to detect a gaze direction of the child user 300 (e.g., through the display), which may be analyzed (e.g., by the computing system 200) to determine that the child user 300 is focused on the new item. Thus, in response to the child user 300 focusing on the new item for the threshold period of time while wearing the augmented reality device, the computing system 200 may identify the new item as a new desired item, receive an image of the new desired item from the camera, and proceed to carry out the steps to determine the one or more purchase plans for the new desired item. As noted above, the one or more purchase plans for the new desired item may then be automatically stored together with the image of the new desired item in the database for future reference by the child user 300. It should be appreciated that the one or more purchase plans may also be presented alone, without the image of the desired item 306 and/or with some other indicator of the desired item 306.

The computing system 200 may then analyze this input to identify the correct set of the building block that the child user 300 is interested in purchasing. The computing system 200 may identify various stores or marketplaces at which the child user 300 may purchase the desired item 306. The computing system 200 may also determine if there are any relevant deals (e.g., Buy One Get One Free) or coupons that can be applied to the purchase of the desired item 306. In order to generate the one or more purchase plans, the computing system 200 accesses and/or determines a cost of the desired item and also accesses (e.g., from the database, from the storage device) the income-based data. As discussed above, the income-related data received can be input by the child user 300 (or other user) during set up of the financial education application. The income-related data received can be input in a task-based format, a time-based format, an incentive based-format, and/or any other suitable manner.

In the illustrated example, the income-related data is input in a task-based format. The child user 300 has indicated the amount of income earned for each task performed. Here, the child user 300 earns $5 for washing the dishes and loading the dishwasher, $2 for making the child's bed, and $3 for taking out the trash. Based on the income-related data, the system 200 determines the number of times the child user 300 would have to do each of the chores to accumulate enough income to buy the desired item 306 (e.g., the 1000 piece set of the building blocks) which has a purchase price of $79.99, excluding taxes and other fees. However, in some embodiments, the computing system 200 may determine and/or otherwise include any taxes and fees to determine the one or more purchase plans. In the illustrated example, the computing system 200 determines that the child user 300 would need to do the dishes approximately 16 times to earn enough income to purchase the desired item 306, and the computing system 200 may output the purchase plan that indicates or suggests the number of times that one or more tasks would need to be completed in order to purchase the desired item 306. Thus, in this example, the child user 300 can determine if doing the dishes 16 times is worth buying desired item 306. The child user 300 can also use the one or more purchase plans to see how many times the child user 300 would have to do other tasks in order to accumulate enough income to buy the desired item 306. In this example, the child user 300 can make the child's bed approximately 40 times or take out the trash approximately 27 times in order to earn enough income to buy the desired item 306.

The one or more purchase plans may include a combination of different tasks. For example, one purchase plan may include completing the dishes 8 times, making the bed 8 times, and taking out the trash 8 times. If the child user 300 has expressed a preference, such as by ranking completing the dishes higher than taking out the trash, one purchase plan may instead include completing the dishes 10 times, making the bed 8 times, and taking out the trash 5 times. The one or more purchase plans may account for existing savings or give the child user 300 the option to account or use some or all of the existing savings, such as by subtracting the existing savings from the purchase price of the desired item 306. It may be appreciated that the purchase plan can be adjusted by indicating that the child user 300 would be interested increasing the amount of income earned over a time period. In this instance, the computing system 200 may revise the one or more purchase plans to help the child user 300 understand that the more tasks that are completed, the more income the child user 300 will earn toward the purchase of the desired item 306.

For example, if the child did all of the child's tasks in a day, the child could earn $10 per day (e.g., $3 for taking out the trash, $2 for making his bed, and $5 for washing the dishes and unloading the dishwasher). The computing system 200 then determines that the child could earn all of the income needed to buy the desired item 306 in as little as 8 days, assuming the child completes all of the child's tasks for 8 days. The computing system 200 may also receive an input and/or determine that certain tasks are unlikely to be done as often (e.g., mowing the lawn) as other tasks (e.g., making the bed) and will not suggest increasing the number of times to complete this task. It may be appreciated that the computing system 200 may provide (e.g., automatically provide) and/or the user 300 may request an updated purchase plan as new information comes in. For example, the computing system 200 may update the purchase plan in response to an input and/or determination that the child did not "stay on track" with the child's tasks, and a new purchase plan may be generated to determine when the child can expect to have accumulated enough income to purchase the desired item 306. Similarly, the computing system 200 may update the purchase plan in response to an input and/or determination that additional income (e.g., through incentive based income, gift) has been added to the child's available funds to indicate that desired item 306 can be purchased sooner and/or in response to an input that the cost of the desired item 306 has changed (e.g., the computing system 200 may periodically or continuously access data that indicates a balance in a bank account of the child user 300 and/or data indicative of the cost of the desired item 306 from one or more sources/stores).

As discussed above, the computing system 200 may compare different desired items selected by the child user 300. For example, the child user 300 could select one or more sets of building blocks that the child user 300 is interested in purchasing. The computing system 200 then could create one or more purchase plans for each of the different sets of the building blocks. The computing system 200 may help the child user 300 realize if the child user 300 were to buy a less expensive set of building blocks, the child user 300 would earn enough income to purchase the item sooner. For example, if the child user 300 chose to purchase a different set of building blocks that cost $59.99, the child user 300 could accumulate this amount of income by doing the dishes approximately 12 times, making the child's bed approximately 30 times, taking out the trash approximately 20 times, or by doing all of his chores totaling $10 per day for approximately 6 days.

In some embodiments, the computing system 200 may suggest other items for the child user 300 to buy based on the child's interests. For example, if the child user 300 has an interest in building blocks, the computing system 200 may determine and suggest similar block toys, stacking toys, interlocking brick toys, or other building toys. The computing system 200 could also suggest items that are more or less expensive to help the child user 300 understand that there are more cost-effective options available or more premium options that the child user 300 could purchase, if the child user 300 earned and saved more income. In the present example, the computing system 200 may suggest other block toys as a more cost-effective option.

The computing system 200 may also suggest new purchase plans in response to any changes to the amount of income available to the child user 300. For example, if the child user 300 receives a birthday gift in the amount of $20, the computing system 200 may determine that the child user 300 can buy the 1000 piece set of the building blocks with a purchase price of $79.99 two days earlier because the child user 300 accumulated enough income due to the birthday gift. Alternatively, the computing system 200 may determine that the child user 300 could buy a bigger set of the building blocks than the child user 300 originally intended to buy by continuing to work the 8 days. In this way, the child user 300 would have accumulated approximately $100 (e.g., $80 from doing all of the child's chores for 8 days and $20 from the child's birthday gift). The computing system 200 may then suggest alternative building block sets that cost approximately $100, such as a set with a greater number of pieces, a model of a particular building, a particular themed set, and so forth. The computing system 200 may periodically or continuously access data that indicates the balance in the bank account of the child user 300 to determine the amount of funds available to the child user 300 and/or the computing system 200 may receive the data via inputs by the child user 300 (or other user).

As noted above, while the examples have focused on desired items for purchase by children, it may be appreciated that the financial education application can be utilized by adults. For example, the computing system 200 can generate a purchase plan to purchase a consumer item, an automobile, or a house. The computing system 200 may also generate purchase plan(s) to accumulate an amount of savings (e.g., for a "rainy day fund"). It may be appreciated that an adult user may use the computing system 200 to input income data that may include expected earnings from a paycheck earned at a job, child support or alimony payments, an inheritance, an expected gift, or other expected earnings. The computing system 200 may generate one or more purchase plans for the adult user. The computing system 200 may update the purchase plans based upon a new job which results in a different paycheck, a second income source (e.g., investment income), and so forth. In some embodiments, the computing system 200 may include a suggested action for the adult user to take to reduce the amount of time it may take to accumulate the desired amount of income to buy the desired item (e.g., automobile). For example, the computing system 200 may suggest that the adult user could get a part-time job to increase earnings in order to accumulate the required income to buy the desired item more quickly.

Advantageously, the disclosed embodiments may provide efficient processing techniques (e.g., generating purchase plans in response to receipt of images or similar information about desired items and/or in response to a user focusing on desired items for a threshold time period) and data storage techniques (e.g., associating purchase plans with desired items for the user). The disclosed embodiments may similarly provide efficient processing techniques for updating the purchase plans. While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
  a device comprising:
    a camera that is configured to obtain an image of a desired acquisition in response to a user looking at the desired acquisition for a threshold period of time; and
    a display screen; and
  one or more processors configured to:
    receive income-related data;
    automatically obtain the image of the desired acquisition from the device in response to the user viewing the desired acquisition for the threshold period of time;
    access at least one database to identify a cost of the desired acquisition;
    generate a purchase plan for the desired acquisition based on the income-related data and the cost, wherein the purchase plan includes an expected time at which the user will accumulate a desired amount of income to purchase the desired acquisition;
    graphically augment the image to generate a graphically-augmented version of the image comprising at least a portion of the image and a graph or a table that presents the purchase plan;
    display the graphically-augmented version of the image on the display screen of the device; and
    generate an additional purchase plan in response to determining that the user is not projected to accumulate the desired amount of income to purchase the desired acquisition by the expected time via the purchase plan.

2. The system of claim 1, wherein the device comprises a smartphone, an augmented reality device, or a virtual reality device.

3. The system of claim 1, wherein the income-related data comprises a task-based format, a time-based format, an incentive-based format, or any combination thereof.

4. The system of claim 1, wherein the one or more processors is configured to calculate an earnings unit that is representative of a number of tasks that, upon completion, would enable the user to have the desired amount of income to purchase the desired acquisition, and wherein the purchase plan is generated based on the earnings unit.

5. The system of claim 4, wherein the one or more processors is configured to generate the purchase plan based on preferences of the user.

6. The system of claim 1, wherein the one or more processors is configured to:
receive a change in the income-related data;
automatically update the purchase plan to generate an updated purchase plan for the desired acquisition based on the change in the income-related data and the cost; and
automatically update the graphically-augmented version of the image based on the updated purchase plan.

7. A system comprising:
an augmented reality device configured to be worn by a user, wherein the augmented reality device comprises:
a camera that is configured to obtain an image of a desired acquisition in response to the user looking at the desired acquisition for a threshold period of time; and
a display screen; and
one or more processors configured to:
receive income-related data, wherein the income-related data comprises a task-based format, a time-based format, or an incentive-based format, or any combination thereof;
automatically obtain the image of the desired acquisition from the augmented reality device in response to the user viewing the desired acquisition for the threshold period of time;
search a database to identify a cost of the desired acquisition;
generate a first purchase plan for the desired acquisition based on the income-related data and the cost, wherein the first purchase plan includes an expected time at which the user will accumulate a desired amount of income to purchase the desired acquisition;
graphically augment the image to generate a first graphically-augmented version of the image comprising at least a portion of the image and a first graph or a first table that presents the first purchase plan;
display the first graphically-augmented version of the image on the display screen of the augmented reality device;
monitor whether the user follows the first purchase plan to accumulate the desired amount of income by the expected time; and
generate a second purchase plan for the desired acquisition based on the income-related data and the cost in response to determining that the user is not projected to accumulate the desired amount of income to purchase the desired acquisition by the expected time via the first purchase plan.

8. The system of claim 7, wherein the second purchase plan includes a second expected time at which the user will accumulate the desired amount of income to purchase the desired acquisition.

9. The system of claim 7, wherein the image comprises a photograph, a scan of a bar code, a stock keeping unit (SKU), a universal product code (UPC), other alphanumeric identifier, or any combination thereof.

10. The system of claim 7, wherein the one or more processors is configured to determine the expected time based on a preference input by the user.

11. The system of claim 7, wherein the one or more processors is configured to:
graphically augment the image to generate a second graphically-augmented version of the image comprising at least the portion of the image and a second graph or a second table that presents the second purchase plan in response to determining that the user is not projected to accumulate the desired amount of income to purchase the desired acquisition by the expected time via the first purchase plan; and
display the second graphically-augmented version of the image on the display screen of the augmented reality device.

12. A system comprising:
one or more processors configured to:
receive income-related data, wherein the income-related data comprises a task-based format, a time-based format, or an incentive-based format, or any combination thereof;
automatically obtain an image of a desired item from a device in response to a user viewing the desired item for a threshold period of time via the device;
determine a cost of the desired item based on the image;
generate a first purchase plan for the desired item based on the income-related data and the cost, wherein the first purchase plan includes an expected time at which the user will accumulate a desired amount of income to purchase the desired item;
graphically augment the image to generate a first graphically-augmented version of the image comprising at least a portion of the image and a first graph or a first table that presents the first purchase plan;
display the first graphically-augmented version of the image on a display screen of the device;
monitor whether the user follows the first purchase plan to accumulate the desired amount of income by the expected time; and
identify a different item for the user to purchase in place of the desired item in response to determining that the user is not projected to accumulate the desired amount of income to purchase the desired item by the expected time via the first purchase plan; and
generate a second purchase plan for the different item based on the income-related data and a different cost of the different item.

13. The system of claim 12, wherein the one or more processors is configured to:
access a bank account of the user in response to receipt of the image to obtain an available amount of funds for the user; and
include the available amount of funds in the first purchase plan.

14. The system of claim 12, wherein the one or more processors is configured to determine the expected time based on a preference input by the user.

15. The system of claim 12, wherein a respective cost of the different item is less than the cost of the desired item.

16. The system of claim 12, wherein the image comprises a photograph, a scan of a bar code, a stock keeping unit (SKU), a universal product code (UPC), other alphanumeric identifier, or any combination thereof.

17. The system of claim 12, comprising the device with the display screen.

18. The system of claim 12, wherein the one or more processors is configured to:
- graphically augment the image to generate a second graphically-augmented version of the image comprising at least the portion of the image and a second graph or a second table that presents the second purchase plan in response to determining that the user is not projected to accumulate the desired amount of income to purchase the desired item by the expected time via the first purchase plan; and
- display the second graphically-augmented version of the image on the display screen.

* * * * *